United States Patent
Miyata et al.

(10) Patent No.: US 7,883,061 B2
(45) Date of Patent: Feb. 8, 2011

(54) EXHAUST PIPE SUPPORT

(75) Inventors: Hiroki Miyata, Inuyama (JP); Takanobu Nanno, Kasugai (JP)

(73) Assignee: Tokai Rubber Industries, Ltd., Komaki-Shi (JP)

( * ) Notice: Subject to any disclaimer, the term of this patent is extended or adjusted under 35 U.S.C. 154(b) by 431 days.

(21) Appl. No.: 12/127,043

(22) Filed: May 27, 2008

(65) Prior Publication Data

US 2009/0020678 A1    Jan. 22, 2009

(30) Foreign Application Priority Data

Jul. 17, 2007    (JP)    ............... 2007-185144

(51) Int. Cl.
*F16M 13/00* (2006.01)
(52) U.S. Cl. .................. 248/60; 248/610; 248/65; 267/140.3; 267/140.11; 267/141
(58) Field of Classification Search ........... 248/49, 248/58, 60, 62, 65, 74.1, 610–614; 267/140.3, 267/140.11, 141
See application file for complete search history.

(56) References Cited

U.S. PATENT DOCUMENTS

| | | | |
|---|---|---|---|
| 5,050,837 A | | 9/1991 | Hamada et al. |
| 5,297,890 A | * | 3/1994 | Commins ............... 403/398 |
| 5,829,732 A | * | 11/1998 | Yamaguchi et al. ......... 248/610 |
| 6,343,777 B1 | * | 2/2002 | Andra ................... 248/610 |
| 6,454,236 B2 | * | 9/2002 | Garaud et al. ............ 248/635 |
| 6,626,413 B1 | * | 9/2003 | Kakimoto et al. .......... 248/610 |
| 7,637,472 B2 | * | 12/2009 | Endo ................... 248/610 |
| 2004/0251586 A1 | * | 12/2004 | Power et al. ............. 267/141 |
| 2009/0001242 A1 | * | 1/2009 | Endo ................... 248/610 |

FOREIGN PATENT DOCUMENTS

| | | |
|---|---|---|
| DE | 295 06 970 U1 | 6/1995 |
| DE | 197 48 824 A1 | 5/1999 |
| EP | 0 411 246 A1 | 2/1991 |
| EP | 1 441 113 A1 | 7/2004 |
| JP | 01-240717 A1 | 9/1989 |
| JP | 05-164167 A1 | 6/1993 |
| JP | 09-112633 A1 | 5/1997 |
| JP | 09-296848 A1 | 11/1997 |
| JP | 10-231891 A1 | 9/1998 |
| JP | 11-082624 A1 | 3/1999 |
| JP | 2004-084840 A1 | 3/2004 |

* cited by examiner

*Primary Examiner*—Terrell Mckinnon
*Assistant Examiner*—Steven M Marsh
(74) *Attorney, Agent, or Firm*—Burr & Brown (57) ABSTRACT

An exhaust pipe support including an elastic body having a ring shape, the elastic body comprising: an upper attachment portion having an upper attachment hole; a lower attachment portion having a lower attachment hole; and a pair of arm portions mutually connecting the upper and lower attachment portion. A first reinforcement rib is integrally formed on each outer circumferential surface of the arm portions. An upper end thereof is located at a higher position than a connecting position of an inner circumferential surface of the arm portion and the upper attachment portion and at a higher position than the center of the upper attachment hole, while a lower end thereof is located at a lower position than a connecting position of the inner circumferential surface of the arm portion and the lower attachment portion and at a lower position than the center of the lower attachment hole.

10 Claims, 3 Drawing Sheets

EXHAUST PIPE SUPPORT

The present application is based on Japanese Patent Application No. 2007-185144 filed on Jul. 17, 2007, the contents of which are incorporated herein by reference.

BACKGROUND OF THE INVENTION

1. Field of the Invention

The present invention relates to an exhaust pipe support, and in particular to an improved structure of an exhaust pipe support that is suitably used for supporting an exhaust pipe of a vehicle such as automobile to the vehicle body in a vibration damping fashion.

2. Discussion of Related Art

Generally, an exhaust pipe of engine (internal combustion engine) in a vehicle such as automobile is connected to the engine at a front end thereof which is positioned at a front side in the frontward and backward direction of the vehicle. At the middle and rearward thereof, the exhaust pipe is elastically suspended and supported to the vehicle body via an exhaust pipe support made of a predetermined elastic supporting member, which is a so-called muffler support.

As one type of exhaust pipe support, there is known an exhaust pipe support comprising an elastic body having a ring shape for suspending an exhaust pipe from a vehicle body. Such an elastic body has, in its upper part, an upper attachment portion which is provided with an upper attachment hole extending parallel with an axial direction of the elastic body and into which a supporting member of a vehicle body side is to be inserted, and in a lower part of the elastic body located symmetrically to the upper part where the upper attachment portion is disposed, a lower attachment portion which is provided with a lower attachment hole extending parallel with the axial direction of the elastic body and into which a supporting member of an exhaust pipe side is to be inserted, and further a pair of arm portions which extends in the vertical direction to mutually connect the upper attachment portion and the lower attachment portion. In the exhaust pipe support having such a structure, vibration is transmitted from the exhaust pipe to the vehicle body or from the vehicle body to the exhaust pipe by driving of engine, traveling of vehicle and the like, and the transmitted vibration is absorbed or reduced by elastic deformation of the pair of arm portions.

However, in such a conventional exhaust pipe support, when large tensile stress and compression stress is applied to the pair of arm portions in the vertical direction due to input vibration, a phenomenon of surging occurs by which the pair of arm portions vibrates in both directions perpendicular to the vertical and axial directions of the ring-shaped elastic body composing the exhaust pipe support, especially in antiphase. When such a surging phenomenon occurs, an absolute spring constant of the supporting apparatus as a whole (mainly of the pair of the arm portions of elastic body) becomes extremely large in a high frequency range of 500 Hz or higher and vibration transmissivity increases. This may cause the problem of deterioration in damping effect.

In such a circumstance, there is proposed an exhaust pipe support having a so-called O-shape which has a center connecting part formed of elastic material in the inside space of the ring-shaped elastic body to mutually connect middle parts of the pair of arm portions (see, U.S. Pat. No. 5,050,837, for example). In the exhaust pipe support having such a structure, the vibration caused by the surging phenomenon in the high frequency range as described above can be moderated by tension and compression effects of the center connecting part. As a result, the absolute spring constant in the high frequency range of the whole of the supporting apparatus is advantageously reduced, thereby advantageously improving vibration damping effect.

However, inventors of the present application examined vibration damping performance of such a conventional θ-shaped exhaust pipe support in various ways, and found that such a θ-shaped exhaust pipe support has a problem related to vibration damping that is not observed in the conventional so-called O-shaped exhaust pipe support not having a center connecting part.

Specifically, a natural frequency of the center connecting part made of elastic material, which is provided in the conventional θ-shaped exhaust pipe support is generally about 300 Hz. Therefore, it was found that in the θ-shaped exhaust pipe support having such a center connecting part, surging phenomenon occurs in the middle to low frequency range of about 300 Hz, and the absolute spring constant of the whole of the supporting apparatus is increased to some extent, though not to the extent of increase in the high frequency range of the O-shaped exhaust pipe support. As a result, the vibration damping effect inevitably decreases in the middle to low frequency range of about 300 Hz.

SUMMARY OF THE INVENTION

The present invention has been made in the light of the situations described above. It is therefore an object of the invention to provide an improved structure of an exhaust pipe support capable of advantageously increasing vibration damping effect in a high frequency range without deteriorating vibration damping effect in a middle to lower frequency range.

The above object may be attained according to a first aspect of the present invention, which provides an exhaust pipe support including an elastic body having a ring shape for suspending an exhaust pipe from a vehicle body, the elastic body comprising: an upper attachment portion having an upper attachment hole which extends parallel with an axial direction of the elastic body and into which a supporting member of a vehicle body side is to be inserted, the upper attachment portion being disposed in an upper part of the elastic body; a lower attachment portion having a lower attachment hole which extends parallel with the axial direction of the elastic body and into which a supporting member of an exhaust pipe side is to be inserted, the lower attachment being disposed in a lower part of the elastic body positioned symmetrically to the upper part where the upper attachment portion is disposed; and a pair of arm portions extending in the vertical direction and mutually connecting the upper attachment portion and the lower attachment portion to form the ring shape, wherein a first reinforcement rib formed of elastic material is integrally formed on each outer circumferential surface of the pair of arm portions so as to protrude at a predetermined height and extend continuously in the vertical direction along the arm portions, an upper end of the first reinforcement rib being located at a higher position than a connecting position of an inner circumferential surface of the arm portion and the upper attachment portion and at a higher position than the center of the upper attachment hole of the upper attachment portion, while a lower end of the first reinforcement rib being located at a lower position than a connecting position of the inner circumferential surface of the arm portion and the lower attachment portion and at a lower position than the center of the lower attachment hole of the lower attachment portion.

The exhaust pipe support according to the present invention does not have a center connecting part formed of elastic material located between the upper and lower attachment portions in the inside space of the ring-shaped elastic body to mutually connect the pair of arm portions. Therefore, unlike the conventional θ-shape exhaust pipe support, the surging phenomenon in the middle to low frequency range of about 300 Hz will not occur, and consequently, deterioration in vibration damping effect in the middle to low frequency range can be effectively and perfectly prevented.

In the exhaust pipe support according to the present invention, the first reinforcement rib protruding at the predetermined height and extending continuously in the vertical direction along the arm portion is formed integrally on the outer circumferential face of the arm portion. Therefore, rigidity against elastic deformation which caused by tension and compression of the arm portion in the vertical direction is advantageously increased, thereby effectively reducing both tensile stress and compression stress in the vertical direction occurring in the arm portion based on input vibration.

In addition, according to the present invention, when vibration is transmitted from the exhaust pipe to the vehicle body or from the vehicle body to the exhaust pipe in a state in which the supporting member of the vehicle body side is inserted into the upper attachment hole of the upper attachment portion and the supporting member of the exhaust pipe side is inserted into the lower attachment hole of the lower attachment portion, an upper part and a lower part of the arm portion are substantially disabled to elastically deform. The upper part of the arm portion is located at a position higher than the connecting position of the inner circumferential face of the arm portion and the upper attachment portion and higher than the center of the upper attachment hole of the upper attachment portion, and the lower part of the arm portion is located at a position lower than the connecting position of the inner circumferential face of the arm potion and the lower attachment portion and lower than the center of the lower attachment hole of the lower attachment portion. Since the upper end and the lower end of the first reinforcement rib that is formed integrally with the arm portion are positioned in the upper part and the lower part of the arm portion, tension amount and compression amount due to the elastic deformation in the vertical direction of each arm portion based on input vibration can be still further reduced as compared to the case where a certain reinforcement rib is integrally formed only on the middle part of the outer circumferential face of the arm portion that is elastically deformed by input vibration. Thereby, it is possible to more effectively reduce the tensile stress and the compression stress in the vertical direction which occurs in the arm portions based on vibration input. As a result, occurrence of the surging phenomenon in the high frequency range is advantageously prevented, and consequently, the absolute spring constant of the whole of the supporting apparatus in the high frequency range can be more effectively reduced.

In the exhaust pipe support according to the present invention, rigidity of the arm portion is improved by forming the first reinforcement rib integrally with the arm portion. Therefore, an increase in volume of the arm portion is effectively suppressed as compared to the case where rigidity of the arm portion is improved by making the entire arm portion thick, for example. As a result, rigidity of the arm portion can be improved advantageously without increasing the static spring constant of the arm portion unnecessarily.

According to a second aspect of the exhaust pipe support of the present invention, the first reinforcement rib protrudes such that a height thereof gradually increases from its upper end and lower end to its central part in the vertical direction.

According to the second aspect of the present invention, the protruding height of the first reinforcement rib is small in the vicinity of the upper end and the lower end of the first reinforcement rib respectively located on the upper attachment portion and the lower attachment portion. As a result, it is possible to advantageously prevent that the first reinforcement rib from contacting and interfering with other members located in the vicinity of the supporting members inserted into the upper and lower attachment portions on the vehicle body side and the exhaust pipe side. Consequently, at the time of vibration input, inhibition of the elastic deformation of the arm portion having the first reinforcement rib thereon can be prevented, which is caused by the contact or interference of the first reinforcement rib and the other members, thereby stably exhibiting sufficient vibration damping performance.

In addition, according to the second aspect, volume of the first reinforcement rib is reduced as compared to the case where the protruding height of the first reinforcement rib is constant over the entire length, for example. As a result, an increase in the static spring constant of the arm portion due to the integral formation of the first reinforcement rib is reduced to the maximum extent possible, and an unnecessary increase of the static spring constant of the whole of the supporting apparatus can be effectively suppressed.

According to a third aspect of the exhaust pipe support of the present invention, a protruding end of the first reinforcement rib extends from one of the upper end and the lower end of the first reinforcement rib to the other while drawing a smooth curve with no local concavity and convexity.

According to the third aspect, there is no bending point or local concave and convex parts on the protruding end face of the first reinforcement rib. Accordingly, when the arm portion elastically deforms due to input vibration, it can be advantageously prevented that stress concentrates at bending point or local concave and convex parts of the first reinforcement rib which is formed integrally with the arm portion. As a result, sufficient durability can be stably ensured.

According to a fourth aspect of the exhaust pipe support of the present invention, the first reinforcement rib has an inverted U-shaped or rounded inverted V-shaped cross section.

According to the fourth aspect, stress will not concentrate at a corner of the first reinforcement rib when the arm portion elastically deforms due to input vibration. This also stably ensures sufficient durability.

According to a fifth aspect of the exhaust pipe support of the present invention, only one first reinforcement rib is formed integrally on the each outer circumferential surface of the arm portions so as to be located in the central part of the arm portions in the axial direction of the elastic body.

According to the fifth aspect, rigidity of the arm portion is improved in good balance. Additionally, an increase in the volume of the arm portion due to the formation of the first reinforcement rib is suppressed to the maximum extent possible, for example, as compared to the case where a plurality of first reinforcement ribs are provided on the outer circumferential face of the arm portion at intervals along its width direction. As a result, an unnecessary increase in the static spring constant of the arm portion due to the formation of the first reinforcement rib can be advantageously prevented.

According to a sixth aspect of the exhaust pipe support of the present invention, a maximum height of the first reinforcement rib is dimensioned to be 30 to 150% relative to a thickness of the arm portion in the direction perpendicular to the axial direction of the elastic body.

According to the sixth aspect, improvement of rigidity of the arm portion by the formation of the first reinforcement rib can be sufficiently ensured. In addition, it is prevented that the volume of the first reinforcement rib becomes excessively large. As a result, an increase in the static spring constant of the arm portion can be suppressed to the maximum extent possible.

According to a seventh aspect of the exhaust pipe support of the present invention, on at least either one of lateral surfaces of the arm portion that are located on both sides in the axial direction of the elastic body having the ring shape, a second reinforcement rib formed of elastic material is integrally formed so as to protrude at a predetermined height and extend continuously in the vertical direction along the arm portion.

In the seventh aspect, it is possible to advantageously improve the spring constant of the whole of the elastic body without increasing the size of the elastic body composing the exhaust pipe support. Accordingly, only by appropriately adjusting size, length and the like of the second reinforcement rib, it is possible to readily tune the spring constant of the whole of the exhaust pipe support. As a result, it is possible to effectively ensure the spring constant that is equivalent to that of the conventional O-shaped exhaust pipe support, for example, while having the O-shape.

According to the seventh aspect, rigidity of the arm portion against bending deformation in the axial direction of the elastic body composing the exhaust pipe support can be increased, thereby suppressing the occurrence of the surging phenomenon in the high frequency range.

In addition, according to an eighth aspect of the exhaust pipe support of the present invention, an upper end of the second reinforcement rib is positioned on at least one of end faces on both sides in an axial direction of the upper attachment portion, while a lower end of the second reinforcement rib is positioned on an end face of the lower attachment portion on the side where the upper end of the second reinforcement rib is positioned.

According to the eighth aspect, sufficient length of the second reinforcement rib can be ensured. As a result, it is possible to improve the spring constant of the whole of the elastic body still more advantageously while avoiding increase in size of the elastic body composing the exhaust pipe support.

According to a ninth aspect of the exhaust pipe support of the present invention, the second reinforcement rib has an inverted U-shaped or rounded inverted V-shaped cross section.

According to the ninth aspect, stress will not concentrate at a corner part of the second reinforcement rib when the arm portion elastically deforms due to input vibration. As a result, sufficient durability can be stably ensured.

According to a tenth aspect of the exhaust pipe support of the present invention, a maximum height of the second reinforcement rib is dimensioned to be 10 to 50% relative to a width of the arm portion in the direction parallel with the axial direction of the elastic body.

According to the tenth aspect, an excess increase in volume of the second reinforcement rib will be prevented, whereby it is possible to sufficiently ensure the improvement of the static spring constant while advantageously suppressing an excess increase in the static spring constant of the arm portion, and consequently of the whole of the supporting apparatus, as a result of the formation of the second reinforcement rib.

As is apparent from the forgoing description, according to the exhaust pipe support of the present invention, it is possible to advantageously improve the vibration damping effect in the high frequency range without deteriorating the vibration damping effect in the middle to low frequency range. As a result, it can effectively exhibit vibration damping performance that well satisfies recent exact required performance for the exhaust pipe support.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DESCRIPTION OF THE PREFERRED EMBODIMENTS

To further clarify the present invention, there will be described in detail embodiments of the invention with reference to the accompanying drawings.

Figure 1:
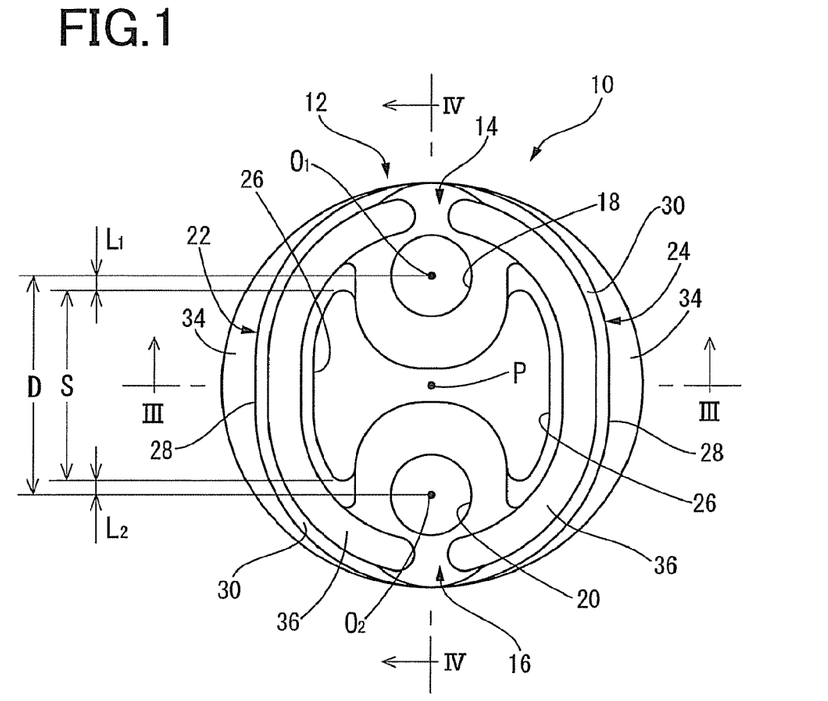
FIG. 1 is a front explanatory view showing one embodiment of an exhaust pipe support having a structure according to the present invention.
Figure 2:
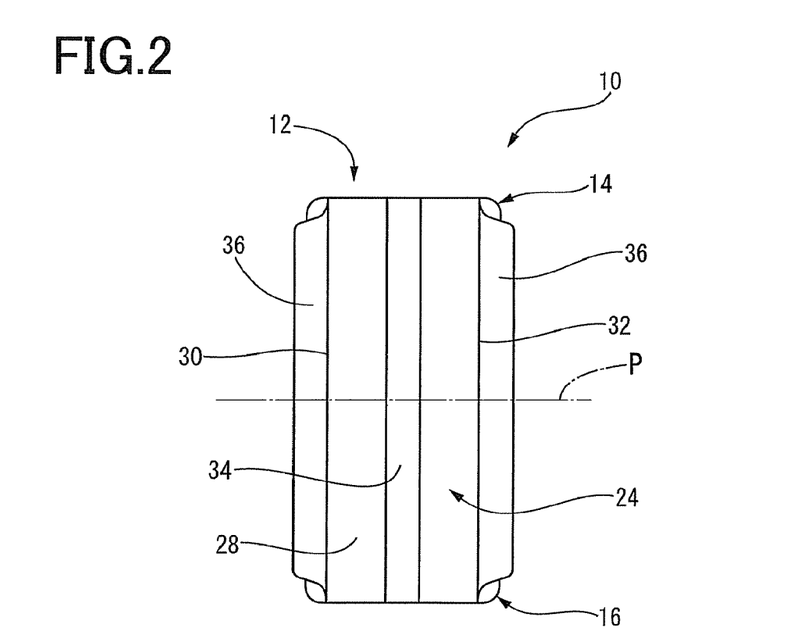
FIG. 2 is a right-side explanatory view of FIG. 1.
Figure 3:
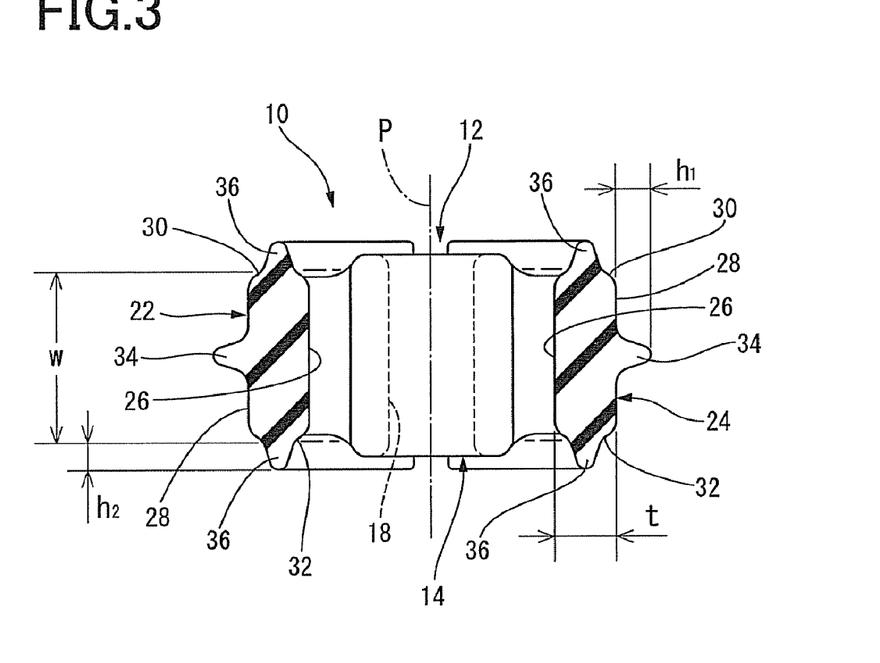
FIG. 3 is an explanatory cross sectional view taken along line III-III of FIG. 1.
Figure 4:
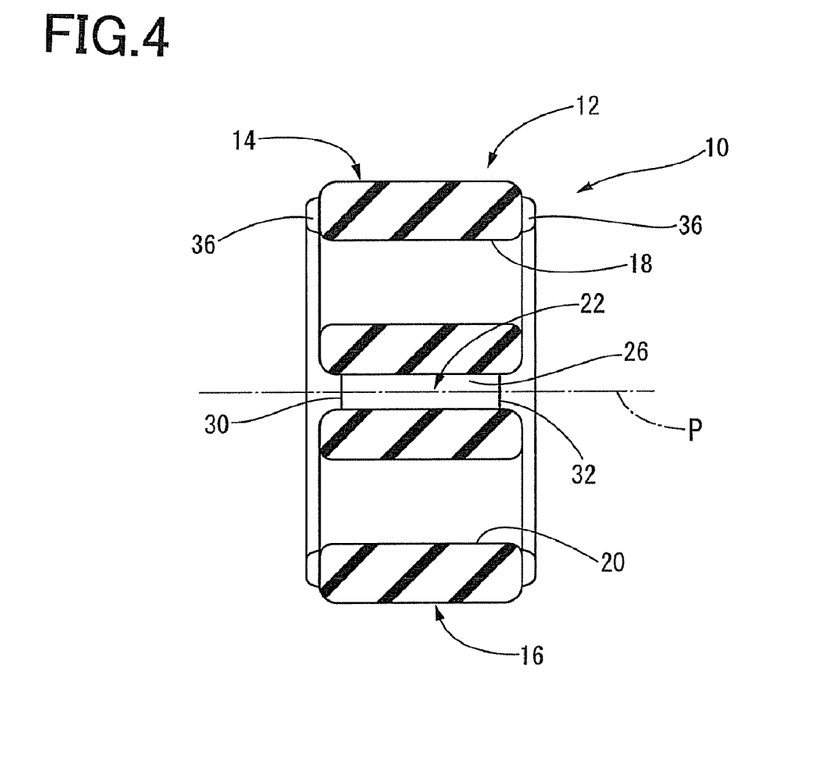
FIG. 4 is an explanatory cross sectional view taken along line IV-IV of FIG. 1.

Referring first to FIG. 1, as one embodiment of an exhaust pipe support having a structure according to the present invention, there is shown a front view of a muffler support retaining an exhaust pipe of an automobile to a vehicle body. FIG. 2 is a side view of the muffler support. FIG. 3 and FIG. 4 show a horizontal sectional view and a vertical sectional view respectively in the axial direction of the muffler support. As is apparent from these views, a muffler support 10 of the present embodiment has an elastic body 12 formed of rubber elastic material. The elastic body 12 has an oval ring or a cylindrical shape.

As shown in FIG. 1, an upper attachment portion 14 and a lower attachment portion 16 is integrally provided in the elastic body 12 with a predetermined distance therebetween (spaced apart from each other) in the vertical direction, so that they are located in an upper part and a lower part which are positioned symmetrically about a center axis P in the vertical direction. Each of these upper attachment portion 14 and the lower attachment portion 16 as a whole has a substantially cylindrical shape which is sufficiently smaller in diameter than the elastic body 12, and has a circular inner hole extending parallel with the direction of center axis P of the elastic body 12. The inner hole of the upper attachment portion 14 is named an upper attachment hole 18, while the inner hole of the lower attachment portion 16 is named a lower attachment hole 20. Into these upper attachment hole 18 and lower attachment hole 20, supporting members of the vehicle body side and the exhaust pipe side (not shown) are respectively inserted and attached.

Both end parts in the axial direction of the upper attachment portion 14 and the lower attachment portion 16 are respectively protruded at a predetermined length from end faces of both sides in the thickness direction of the elastic body 12 as is apparent from FIGS. 2 and 4. In addition, a part of a cylindrical wall of each of the attachment portions 14 and 16 is partly protruded into an inner space of the elastic body 12 as shown in FIG. 1. As a result, the elastic body 12 has a substantially H-shaped through hole which axially penetrates the central part of the elastic body 12 having a substantially cylindrical shape. Further, each of the upper attachment portion 14 and the lower attachment portion 16 is respectively provided with the upper attachment hole 18 and the lower attachment hole 20 having predetermined diameter, and besides, the upper and lower attachment portions 14 and 16 is made to have sufficiently large axial length and thickness. Therefore, the upper and lower attachment portions 14 and 16 are able to exhibit sufficient strength against an applied load in a state where the supporting members of the vehicle body side and the exhaust pipe side are respectively inserted into the attachment holes 18 and 20.

In the elastic body 12, two middle parts located between the upper attachment portion 14 and the lower attachment portion 16 provided in the upper part and the lower part of the elastic body 12, respectively, are formed into a first arm portion 22 and a second arm portion 24, respectively, to constitute a pair of arm portions.

These first and second arm portions 22 and 24 are formed of two curved sheet-like rubber members having a generally rectangular cross section and have relatively large thickness (dimension in the left and right direction in FIG. 1) and large width (dimension perpendicular to the sheet face in FIG. 1 and corresponding to the axial length of the cylindrical elastic body 12). Between the upper attachment portion 14 and the lower attachment portion 16 which are disposed with a predetermined distance therebetween in the vertical direction, the first and second arm portions 22 and 24 are disposed oppositely so as to space apart from each other in the direction perpendicular to the direction which is parallel with the center axis P and the direction perpendicular to the vertical direction (left and right direction in FIG. 1). Further, in such a condition, the first and second arm portions 22 and 24 are arranged so as to extend in the vertical direction while they each are curved to have an outwardly convex shape in the opposing directions thereof.

In each of the first and second arm portions 22 and 24, as shown in FIG. 1, a lateral face that forms a part of an inner circumferential face of the elastic body 12 is named an inner circumferential portion 26, while a lateral face opposite to the inner circumferential portion 26 is named an outer circumferential portion 28. Further, a lateral face that forms an end face of one side in the axial direction of the elastic body 12 (left end face in FIG. 2) is named a first lateral face portion 30, and a lateral face that forms an end face of the other side in the axial direction of the elastic body 12 (right end face in FIG. 2) is named a second lateral face portion 32.

Of the pair of arm portions 22 and 24, the first arm portion 22 is integrated at its upper end and lower end with left lateral faces in FIG. 1 of the upper attachment portion 14 and the lower attachment portion 16 respectively, to mutually connect the left lateral faces of these attachment portions 14 and 16. The second arm portion 24 is integrated at its upper end and lower end with right lateral faces in FIG. 1 of the upper attachment portion 14 and the lower attachment portion 16 respectively, to mutually connect the right lateral faces of these attachment portions 14 and 16.

In such a connected state, a connecting position of the inner circumferential portion 26 of each of the first and second arm portions 22 and 24 and the upper attachment portion 14 is located at a lower position by a predetermined dimension (dimension shown by $L_1$ in FIG. 1) than the center $O_1$ of the upper attachment hole 18 of the upper attachment portion 14. A connecting position of the inner circumferential portion 26 of each of the arm portions 22 and 24 and the lower attachment portion 16 is located at a higher position by a predetermined dimension (dimension shown by $L_2$ in FIG. 1) than the center $O_2$ of the lower attachment hole 20 of the lower attachment portion 16.

Although not clearly shown in the drawing, the supporting member of the vehicle body side and the supporting member of the exhaust pipe side, respectively, to be inserted into the upper and lower attachment portions 14 and 16 are elastically connected via the first and second arm portions 22 and 24, so that the exhaust pipe is elastically suspended and supported with respect to the vehicle body via the muffler support 10. Accordingly, vibration transmitted from the exhaust pipe to the vehicle body or from the vehicle body to the exhaust pipe is absorbed or reduced based on the elastic deformation of the first and second arm portions 22 and 24.

In the muffler support 10 of the present embodiment, in particular, a first reinforcement rib 34 for improving rigidity of each of the arm portions 22 and 24 is formed integrally with the outer circumferential portion 28 of each of the first and second arm portions 22 and 24 in a protruding manner, and a second reinforcement rib 36 for tuning a static spring constant of the whole of the elastic body 12 is formed integrally with the first and second lateral face portions 30 and 32 of each of the arm portions 22 and 24 in a protruding manner. Both of the first and second reinforcement ribs 34 and 36 are made of the same rubber material as the elastic body 12.

More specifically, only one first reinforcement rib 34 is provided on a central part in the width direction (axial direction of the elastic body 12) of each of the outer circumferential portion 28 of the arm portions 22 and 24. Each of the first reinforcement rib 34 has a protruding ridge shape protruding at a predetermined height on the outer circumferential portion 28 of each of the arm portions 22 and 24 and extending continuously in the vertical direction along each of the vertically extending arm portions 22 and 24.

As a result, rigidity of each of the arm portions 22 and 24 is improved in good balance. In particular, the rigidity against elastic deformation in the tension and compression direction (vertical direction) of each of the arm portions 22 and 24 that allows the upper attachment portion 14 and the lower attachment portion 16 to approach to or leave from each other in the vertical direction is improved in good balance. Accordingly, as described above, in a state in which the supporting members on the vehicle body side and on the exhaust pipe side are respectively inserted into the upper and lower attachment portions 14 and 16, both of tensile stress and compression stress are effectively reduced which are applied to the each of the arm portions 22 and 24 in the vertical direction based on vibration input between the vehicle body and the exhaust pipe. Further, as compared to the case where a plurality of first reinforcement ribs 34 are provided on the outer circumferential portion 28 of each of the arm portions 22 and 24, an increase in volume of each of the arm portions 22 and 24 due to the formation of the first reinforcement rib 34 is reduced to the maximum extent possible. Accordingly, it is advantageously prevented that the static spring constant of each of the arm portions 22 and 24 is increased unnecessarily due to the formation of the first reinforcement rib 34.

As shown in FIG. 3, the first reinforcement rib 34 has a protruding ridge shape as a whole and a cross section thereof extending parallel with the center axis P of the elastic body 12 is a rounded inverted V-shape which tapers toward a tip end. That is, the tip end face (protruding end face) has a rounded convex curved face with no corner. Accordingly, it is advantageously prevented that stress is concentrated at one part (corner part or the like) of the tip end of the first reinforcement rib 34 at the time of elastic deformation of each of the arm portions 22 and 24 due to input vibration. As is apparent from FIG. 3, the connecting part on the base side of the first reinforcement rib 34 with respect to each of the arm portions 22 and 24 is formed into a rounded concave curved face. In addition, as apparent from FIG. 1, the connecting part on the inner circumferential portion 26 of each of the arm portions 22 and 24 with respect to the upper and lower attachment portions 14 and 16 is also formed into a rounded concave curved face. This also effectively prevents that stress is concentrated at the base side region of the first reinforcement rib 34 and at the connecting parts of each of the arm portions 22 and 24 with respect to the upper and lower attachment portions 14 and 16, at the time of elastic deformation of each of the arm portions 22 and 24 due to input vibration.

In addition, as is apparent from FIG. 1, the protruding end (outer circumferential edge) of the first reinforcement rib 34 extends from one end (upper end or lower end) to the other end (lower end or upper end) in the extension direction extending in the vertical direction while drawing a semicircle which is one of smooth curves without any local concavity and convexity. On the other hand, as described above, each of the arm portions 22 and 24 is formed by a part of the elastic body 12 having an ellipsoidal overall shape that mutually connects the upper and lower attachment portions 14 and 16. Therefore, the middle part in the extension direction extending upward and downward of the outer circumferential portion 28 of each of the arm portions 22 and 24 is formed into a flat face that extends vertically, while parts on both end sides in the extension direction are formed into curved faces curving in the same direction.

As described above, in the present embodiment, the first reinforcement rib 34 has a substantially crescent shape in the front view (see FIG. 1). The protruding height of the first reinforcement rib 34 gradually increases toward the central part in the vertical direction from both ends (upper end and lower end) in the vertical direction of the first reinforcement rib 34. That is, the protruding height of the first reinforcement rib 34 gradually increases toward the center from both of the end sides in the vertical direction of each of the arm portions 22 and 24, or in other words, it is the highest at the central part in the vertical direction of each of the arm portions 22 and 24.

Since the first reinforcement rib 34 is formed to have the above-described shape, it is possible to advantageously ensure the improvement of rigidity of each of the arm portions 22 and 24, while preventing the first reinforcement rib 34, to the maximum extent possible, from bringing into contact with other members disposed in the vicinity of the supporting members of the vehicle body side and the exhaust pipe side that are inserted into the upper and lower attachment portions 14 and 16. Further, unlike the case where the protruding height of the first reinforcement rib 34 is constant over the entire length in the extending direction of the first reinforcement rib 34, an increase in the volume of each of the arm portions 22 and 24 as a result of the formation of the first reinforcement rib 34 is suppressed as much as possible. Therefore, as will be described later, with the static spring constant of the whole of the elastic body 12 tuned to desired magnitude by the formation of the second reinforcement rib 36, it can be prevented to the maximum extent possible that the static spring constant of the whole elastic body 12 increase unnecessarily along with an increase in volume of the first reinforcement rib 34, and consequently along with an increase in the volume of each of the arm portions 22.

In particular, positions of both ends of the first reinforcement rib 34 in the vertical direction are set so as to coincident with positions of upper end and lower end of each of the arm portions 22 and 24 which are connecting regions to the upper and lower attachment portions 14 and 16. In addition, protruding height of the first reinforcement rib 34 is set so as to be zero at the parts of the outer circumferential portion 28 of the upper end and the lower end of each of the arm portions 22 and 24. The first reinforcement rib 34 extends continuously from the upper end to the lower end of each of the arm portions 22 and 24.

As a result, as is apparent from FIG. 1, the upper end of the first reinforcement rib 34 is located at a position higher than the connecting position of the inner circumferential portion 26 of each of the arm portion 22 and 24 with respect to the upper attachment portion 14 and higher than the position of center $O_1$ of the upper attachment hole 18. Further, the lower end of the first reinforcement rib 34 is located at a position lower than the connecting position of the inner circumferential portion 26 of each of the arm portions 22 and 24 with respect to the lower attachment portion 16 and lower than the position of center $O_2$ of the lower attachment hole 20.

In other words, the first reinforcement rib 34 has a larger length by a predetermined dimension than distance D between the center $O_1$ of the upper attachment hole 18 located at the higher position than the connecting position of the inner circumferential portion 26 of each of the arm portions 22 and 24 with respect to the upper attachment portion 14 and the center $O_2$ of the lower attachment hole 20 located at the lower position than the connecting position of the inner circumferential portion 26 of each of the arm portions 22 and 24 with respect to the lower attachment portion 16. The first reinforcement rib 34 is formed integrally on the outer circumferential portion 28 of each of the arm portions 22 and 24 so as to extend continuously in the vertical direction, while the central part thereof in the longitudinal direction is coincident with the central part of the extension direction extending in the vertical direction of the outer circumferential portion 28 of each of the arm portions 22 and 24.

In the muffler support 10 of the present embodiment, as described above, the center $O_1$ of the upper attachment hole 18 is located at the position higher than the connecting position of the inner circumferential portion 26 of each of the arm portions 22 and 24 and the upper attachment portion 14. Further, the center $O_2$ of the lower attachment hole 20 is located at the position lower than the connecting position of the inner circumferential portion 26 of each of the arm portions 22 and 24 and the lower attachment portion 16. In the muffler support 10, the supporting member of the vehicle body side and the supporting member of the exhaust pipe side are respectively inserted and supported into the upper attachment hole 18 of the upper attachment portion 14 and the lower attachment hole 20 of the lower attachment portion 16, whereby both of the supporting members are elastically connected by the first and second arm portions 22 and 24.

Therefore, when vibration is input between the vehicle body and the exhaust pipe in a state in which the supporting member of the vehicle body side and the supporting member of the exhaust pipe side are elastically connected by the muffler support 10, although the elastic body 12 is elastically deformed at a part which is located between the center $O_1$ of the upper attachment hole 18 and the center $O_2$ of the lower attachment hole 20 (a middle region of each of the arm portions 22 and 24, a lower region of the upper attachment portion 14 and an upper region of the lower attachment portion 16), the elastic body 12 is not elastically deformed practically at a part which is located at a higher position than the center $O_1$ of the upper attachment hole 18 (an upper region of each of the arm portions 22 and 24 and an upper region of the upper attachment portion 14) and at a part which is located at a lower position than the center $O_2$ of the lower attachment hole 20 (a lower region of each of the arm portions 22 and 24 and a lower region of the lower attachment portion 16).

Therefore, in the above muffler support 10, the first reinforcement rib 34 is integrally formed such that it extends continuously from the upper region of each of the arm portions 22 and 24, where elastic deformation due to input vibration is substantially prevented, to the lower end region of the each of the arm portions 22 and 24, where elastic deformation due to input vibration is substantially prevented, through the middle region of each of the arm portions 22 and 24, where elastic deformation is allowed. Therefore, tension amount or compression amount due to the elastic deformation in the vertical direction of each of the arm portions 22 and 24 based on input vibration are advantageously reduced as compared to the case where a reinforcement rib is formed integrally with the outer circumferential portion 28 only in the middle region of each of the arm portions 22 and 24 which is elastically deformed by input vibration. As a result, tensile stress and compression stress in the vertical direction occurring in each of the arm portions 22 and 24 based on input vibration can be further effectively reduced.

The protruding height of the first reinforcement rib 34 is not particularly limited, and may be appropriately changed, for example, depending on the thickness of each of the arm portions 22 and 24, and the like. However, in general, a maximum height $h_1$ of the first reinforcement rib 34 is about 30 to 150%, relative to a thickness t of each of the arm portions 22 and 24.

This is because if the maximum height $h_1$ of the first reinforcement rib 34 is less than 30% of the thickness t of each of the arm portions 22 and 24, the improvement of rigidity of each of the arm portions 22 and 24 cannot be sufficiently expected because of too small height of the first reinforcement rib 34. Moreover, if the maximum height $h_1$ of the first reinforcement rib 34 exceeds 150% relative to the thickness t of each of the arm portions 22 and 24, not only the height of the first reinforcement rib 34 but also the volume of each of the arm portions 22 and 24 become too large. This may cause a risk of the static spring constant of each of the arm portions 22 and 24, and consequently of the elastic body 12 to be excessively large.

Meanwhile, as shown in FIGS. 1 to 3, each of the first lateral face portion 30 and the second lateral face portion 32 of each of the arm portions 22 and 24 have one second reinforcement rib 36 on their respective central parts in the width direction (thickness direction of each of the arm portions 22 and 24). The second reinforcement rib 36 protrudes at a predetermined height from each of the first and second lateral face portions 30 and 32 of each of the arm portions 22 and 24 and exhibits a protruding ridge shape extending continuously in the vertical direction along each of the arm portions 22 and 24.

The second reinforcement rib 36 has a constant height and constant width which is smaller than each width of the first and second lateral face portion 30 and 32 of each of the arm portions 22 and 24 (thickness of each of the arm portions 22 and 24) over the entire length in its extending direction. Also both ends thereof (upper end and lower end) in the extension direction extending in the vertical direction are positioned on end faces of both sides (both sides in the direction parallel with the center axis P of the elastic body 12) in the respective axial directions of the upper attachment portion 14 and the lower attachment portion 16. That is, the second reinforcement rib 36 provided on the first lateral face portion 30 of each of the arm portions 22 and 24 is extended continuously in the vertical direction over a length from an end face on one side in the axial direction of the upper attachment portion 14 to an end face on the one side in the axial direction of the lower attachment portion 16 through the first lateral face portion 30. Further, the second reinforcement rib 36 provided on the second lateral face portion 32 of each of the arm portions 22 and 24 is extended continuously in the vertical direction over a length from an end face on the axially other side of the upper attachment portion 14 to an end face on the axially other side of the lower attachment portion 16 through the second lateral face portion 32.

The second reinforcement rib 36 is integrally formed with each of the arm portions 22 and 24 in the manner as described above, whereby good-balanced tuning is achieved so that the static spring constant of the whole of the elastic body 12 has necessary magnitude without unnecessarily increasing the size of each of the arm portions 22 and 24, and consequently of the entire elastic body 12. Specifically, in the present embodiment, the static spring constant of the whole of the elastic body 12 is tuned so as to be equivalent to that of the whole of the elastic body of a conventional θ-shape muffler support.

Since the second reinforcement rib 36 is integrally formed with the first and second lateral face portion 30 and 32 of each of the arm portions 22 and 24, unlike the first reinforcement rib 34 that is integrally formed with the outer circumferential portion 28 of each of the arm portions 22 and 24, the second reinforcement rib 36 exerts little influence on improvement of rigidity against the elastic deformation of each of the arm portions 22 and 24 in the vertical direction that makes the upper attachment portion 14 and the lower attachment portion 16 approach to or leave from each other. Accordingly, it can be considered that the second reinforcement rib 36 contributes more or less to the improvement of rigidity against the bending deformation of each of the arm portions 22 and 24 in the direction parallel with the center axis P of the elastic body 12.

As is apparent from FIG. 3, the second reinforcement rib 36 also exhibits a protruding ridge shape as a whole likewise the first reinforcement rib 34. Also, it has a rounded inverted V-shaped cross section which tapers toward the tip end. That is, the tip end face (protruding end face) has a rounded convex curved face with no corner. As a result, it is advantageously prevented that stress is concentrated at one part in the end face of the second reinforcement rib 36 at the time of elastic deformation of each of the arm portions 22 and 24 due to input vibration. Also the connecting part on the base side of the second reinforcement rib 36 with respect to each of the arm portions 22 and 24 is formed into a rounded concave curved face. This also effectively prevents that stress is concentrated at the base side region of the second reinforcement rib 36 at the time of elastic deformation of each of the arm portions 22 and 24 due to input vibration.

The protruding height of the second reinforcement rib 36 is not particularly limited, and may be changed appropriately depending on width of each of the arm portions 22 and 24 and the like to obtain a desired value of the static spring constant of the whole of the elastic body 12. However, a maximum height $h_2$ of the second reinforcement rib 36 is generally set within the range of about 10 to 50% relative to a width w of each of the arm portions 22 and 24.

This is because if the maximum height $h_2$ of the second reinforcement rib 36 is less than 10% of the thickness w of each of the arm portions 22 and 24, the height of the second reinforcement rib 36 is too small. Accordingly, the improvement of the static spring constant of each of the arm portions 22 and 24, and consequently of the whole of the elastic body 12 by the formation of the second reinforcement rib 36 cannot be sufficiently expected. If the maximum height $h_2$ of the second reinforcement rib 36 is larger than 50% of the thickness w of each of the arm portions 22 and 24, not only the height of the second reinforcement rib 36 but also the volume of each of the arm portions 22 and 24 become too large. This may cause a risk that the static spring constant of each of the arm portions 22 and 24, and consequently of the elastic body 12 to be excessively large, and also may cause a risk that the second reinforcement rib 26 comes into contact with other members disposed in the vicinity of the supporting members of the vehicle body side and the exhaust pipe side inserted into the upper and lower attachment portions 14 and 16.

As described above, in the muffler support 10 of the present embodiment, the first reinforcement rib 34 is integrally formed so as to extend continuously from the upper end region of the outer circumferential portion 28 of each of the arm portions 22 and 24, which is substantially not elastically deformed at the time of input vibration, to the lower end region of each of the arm portions 22 and 24, which is substantially not elastically deformed at the time of input vibration, through the middle part of each of the arm portions 22 and 24, where elastic deformation is allowed. As a result, rigidity against elastic deformation in the tension and compression direction (vertical direction) of each of the arm portions 22 and 24 is advantageously increased, and both of tensile stress and compression stress in the vertical direction occurring in each of the arm portions 22 and 24 based on input vibration can be effectively reduced. The second reinforcement rib 36 is integrally formed with the first and second lateral face portions 30 and 32 of each of the arm portions 22 and 24 so as to extend continuously over the entire length in the vertical direction of each of the arm portions 22 and 24, whereby improvement of rigidity of each of the arm portions 22 and 24 can also be expected. Therefore, in the above-described muffler support 10, occurrence of a surging phenomenon in a high frequency range (for example, 500 Hz or higher) can be advantageously prevented.

Unlike the conventional θ-shape muffler support, the present embodiment does not have any center connecting part made of elastic material that connects the first arm portion 22 and the second arm portion 24 in their middle parts in their longitudinal direction (extending direction in the vertical direction). Therefore, the surging phenomenon will not occur in a middle to low frequency range of about 300 Hz, which is caused by such a center connecting part.

In the muffler support 10 of the above-described present embodiment, occurrence of the surging phenomenon in the middle to low frequency range and in the high frequency range is advantageously prevented, so that the absolute spring constant of the whole of the elastic body 12 can be effectively reduced in the high frequency range as well as in the middle to low frequency range. As a result, excellent vibration damping performance can be effectively exhibited that sufficiently satisfies recent exact required performance for the exhaust pipe support.

The second reinforcement rib 36 is integrally formed with the first and second lateral face portions 30 and 32 of each of the arm portions 22 and 24 such that it extends continuously over the entire length thereof, whereby the static spring constant of each of the arm portions 22 and 24, and consequently of the whole of the elastic body 12 is tuned to desired magnitude. Further, since the first reinforcement rib 34 has the protruding ridge shape and the protruding height that gradually increases toward the central part from both the ends (upper end and lower end) in the longitudinal direction (extending direction) extending in the vertical direction, an increase of the volume of each of the arm portions 22 and 24 as a whole due to the formation of the first reinforcement rib 34 is suppressed as much as possible, and an unnecessary increase in the static spring constant of each of the arm portions 22 and 24 is advantageously prevented. As a result, the muffler support 10 of the preset embodiment is able to securely fix the exhaust pipe to the vehicle body at a desired position, for example.

Further, the protruding height of the first reinforcement rib 34 gradually increases toward the central part in its longitudinal direction, in other words, the height thereof gradually decreases toward both the ends in the longitudinal direction, and in particular, the protruding height is zero at both the ends, whereby it is possible to prevent, to the maximum extent possible, the first reinforcement rib 34 from coming into contact with other members located in the vicinity of the supporting members of the vehicle body side and the exhaust pipe side to be attached to the upper and lower attachment portions 14 and 16. As a result, it is possible to prevent adverse effect on the vibration damping performance, which is caused by interference between the other members and the first reinforcement rib 34, and which results in inhibition of elastic deformation occurring at the time of vibration input of each of the arm portions 22 and 24 with which the first reinforcement rib 34 is integrally formed.

In the illustrated muffler support 10, the protruding end of the first reinforcement rib 34 extends from one of the upper end and the lower end of the first reinforcement rib 34 to the other while drawing a smooth semicircle with no concavity and convexity, and both of the first reinforcement rib 34 and the second reinforcement rib 36 have the inverted V-shaped cross section which tapers toward the tip end and the tip end face (protruding end face) of rounded convex curved face. This prevents that the stress is concentrated locally on the first reinforcement rib 34 and the second reinforcement rib 36 at the time of elastic deformation of each of the arm portions 22 and 24 due to input vibration, thereby stably ensuring sufficient durability.

In the present embodiment, regions such as the base side regions of the first and second reinforcement ribs 34 and 36 and the connecting regions of the inner circumferential portion 26 of each of the arm portions 22 and 24 to the upper and lower attachment portions 14 and 16 have concave curved faces, thereby preventing the stress from concentrating on these regions at the time of vibration input. This also improves durability of the whole of the muffler support 10.

In the above muffler support 10, only one first reinforcement rib 34 is integrally formed on the central part in the width direction of the outer circumferential portion 28 of each of the arm portions 22 and 24. Therefore, unlike the case where a plurality of reinforcement ribs are provided on the outer circumferential portion 28 of each of the arm portions 22 and 24, despite the integral formation of the first reinforcement rib 34, it is possible to advantageously increase the rigidity of each of the arm portions 22 and 24, with the volume of each of the arm portions 22 and 24 prevented from becoming excessively large and the static spring constant of each of the arm portions 22 and 24 prevented from increasing unnecessarily to the maximum extent possible.

The entirety of the muffler support 10 of the present embodiment is formed of single rubber elastic material, whereby excellent formability and cost reduction can be advantageously achieved.

The above muffler support 10 has a basic structure similar to that of conventional muffler supports having θ-shape, O-shape and the like in which the upper and lower attachment portions 14 and 16 are connected integrally with the pair of arm portions 22 and 24, with the exception that the first reinforcement rib 34 and the second reinforcement rib 36 are formed integrally with the outer circumferential portion 28 and the first and second lateral face portions 30 and 32 of each of the first and second arm portions 22 and 24. Therefore, the muffler support 10 may be readily replaced with a conventional muffler support having θ-shape or O-shape used in the present state of art.

In the muffler support 10 of the present embodiment, the first and second reinforcement ribs 34 and 36 are integrally formed with each of the arm portions 22 and 24, whereby surface area of the elastic body 12 is advantageously increased as compared to the conventional O-shape muffler support. Therefore, heat dissipation from the surface of the elastic body 12 at the time of elastic deformation due to vibration input can be effectively improved. This also improves durability of the muffler support 10.

To clarify the above-described excellent features of the muffler support 10 of the present embodiment, there will be described FEM analysis carried out by the present inventors.

First, the muffler support 10 (the present invention) and a conventional muffler support (Comparative article 1) were prepared for carrying out the FEM analysis. The muffler support 10 has the structure shown in FIGS. 1 to 4, in which the first reinforcement rib 34 is formed integrally with the outer circumferential portion 28 of the first arm portion 22 and the second arm portion 24, and the second reinforcement rib 36 is formed integrally with the first and second lateral face portions 30 and 32 of each of the arm portions 22 and 24. The conventional muffler support has the same structure as the muffler support 10 shown in FIGS. 1 to 4 with the exception that each of the first and second arm portions (22) and (24) is not provided with any of the first reinforcement rib (34) and the second reinforcement rib (36).

Separately from these, a muffler support (Comparative article 2) was prepared. The muffler support has the first reinforcement rib (34) provided on the outer circumferential portion (28) of the first and second arm portions (22) and (24) and the second reinforcement rib (36) provided on the first and second lateral face portions (30) and (32) of each of the first and second arm portions (22) and (24). The first reinforcement rib (34), however, has a smaller length than the distance between the connecting parts of the inner circumferential portion (26) of each of the arm portions (22) and (24) with respect to the upper and lower attachment portions (14) and (16) (dimension denoted by S in FIG. 1) and extends on both sides while crossing the central part in the longitudinal direction of each of the arm portions (22) and (24). In other words, the first reinforcement rib (34) is formed integrally only with the middle region of the outer circumferential portion (28) of each of the arm portions (22) and (24) where elastic tension and compression deformation in the vertical direction is allowed at the time of vibration input.

Then, FEM analysis was carried out in a conventional manner on each of the prepared three muffler supports (the present invention, Comparative articles 1 and 2) in order to examine relationship between the absolute spring constant (vibration conductivity) and the vibration frequency. The result is shown in FIG. 5.

Figure 5:
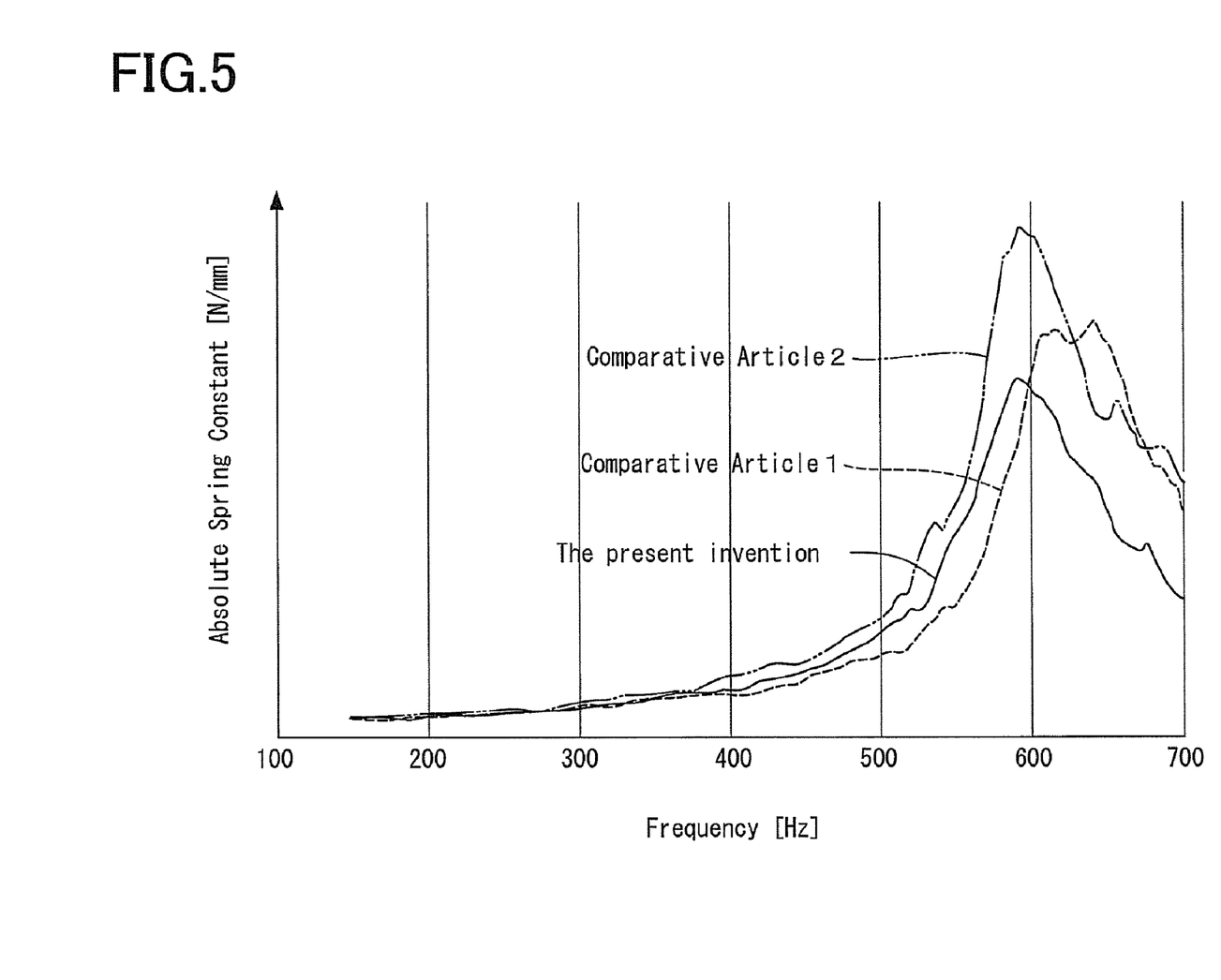
FIG. 5 is a graph showing a relationship between the absolute spring constant and the vibration frequency obtained by FEM analysis, which is conducted on an exhaust pipe support having a structure according to the present invention and exhaust pipe supports having a conventional structure.

As is apparent from FIG. 5, the muffler support according to the present invention indicates a peak value of the absolute spring constant at a frequency of about 600 Hz. The peak value of the absolute spring constant thereof is sufficiently smaller than that of the muffler support of Comparative article 1 which indicates a peak value at a frequency a little larger than 600 Hz, and also smaller than that of the muffler support of Comparative article 2 which indicates a peak value at a frequency of about 600 Hz. The peak value of the absolute spring constant of the muffler support of Comparative article 2 is larger than the peak value of the absolute spring constant of the muffler support of Comparative article 1. This clearly indicates that the muffler support having the structure according to the present invention exhibits more excellent vibration damping performance than the muffler supports of Comparative articles 1 and 2.

While the preferred embodiment of the present invention has been described in detail above, for illustrative purpose only, it is to be understood that the present invention is not limited to the details of the illustrated embodiment.

For example, the positions of the upper end and the lower end of the first reinforcement rib 34 are not limited to the positions coincident with the upper end and the lower end which are the connecting parts of each of the arm portions 22 and 24 with respect to the upper and lower attachment portions 14 and 16, as long as the upper end is located at the higher position than the connecting position of the inner circumferential portion 26 of each of the arm portions 22 and 24 with respect to the upper attachment portion 14 and at the higher position than the position of center $O_1$ of the upper attachment hole 18 of the upper attachment portion 14, while the lower end is located at the lower position than the connecting position of the inner circumferential portion 26 of each of the arm portions 22 and 24 with respect to the lower attachment portion 16, and at the lower position than the position of center $O_2$ of the lower attachment hole 20 of the lower attachment portion 16.

The connecting positions of the inner circumferential portion 26 of each of the arm portions 22 and 24 with respect to the upper and lower attachment portions 14 and 16 are not particularly limited. For example, the connecting position of the inner circumferential portion 26 of each of the arm portions 22 and 24 with respect to the upper attachment portion 14 may be located at a higher position than the position of center $O_1$ of the upper attachment hole 18 of the upper attachment portion 14, while the connecting position of the inner circumferential portion 26 of each of the arm portions 22 and 24 with respect to the lower attachment portion 16 may be located at a lower position than the position of center $O_2$ of the lower attachment hole 20 of the lower attachment portion 16.

The number and the position of the first reinforcement rib 34 provided on the outer circumferential portion 28 of each of the arm portions 22 and 24, and also the protruding height thereof from the outer circumferential portion 28 are not particularly limited to that of the illustrated embodiment, but may be appropriately changed depending on the size of each of the arm portions 22 and 24, the whole size of the muffler support 10, and magnitude of rigidity requested for each of the arm portions 22 and 24. For example, the protruding height of the first reinforcement rib 34 from the outer circumferential portion 28 may be constant over the entire length.

The shape of the entire protruding end of the first reinforcement rib 34 and the longitudinal cross section of the first reinforcement rib 34 are not limited to those illustrated in the above embodiment.

Although the second reinforcement rib 36 is not essential in the present invention, when it is formed integrally with each of the arm portions 22 and 24, the disposing position and the disposing number, the cross sectional shape and the like thereof are not particularly limited to that of the illustrated embodiment as long as it is disposed on at least either one of the first lateral face portion 30 and the second lateral face portion 32 of each of the arm portions 22 and 24.

While the exhaust pipe support (muffler support) for supporting an exhaust pipe of an automobile to a vehicle body has been described as the embodiment of the invention, it is to be understood that the principle of the present invention is advantageously applied to any exhaust pipe support for supporting an exhaust pipe of a vehicle other than automobile.

While the specific embodiment of the present invention has been described in detail above, for the illustrative purpose only, and the present invention can be embodied in other various manners. It is to be understood that the present invention is not limited to the foregoing description, but may be embodied with various changes, modifications, and improvements that may occur to those skilled in the art, without departing from the scope of the invention defined in the attached claims.

What is claimed is:

1. An exhaust pipe support including an elastic body having a ring shape for suspending an exhaust pipe from a vehicle body, the elastic body comprising:
    an upper attachment portion having an upper attachment hole which extends parallel with an axial direction of the elastic body and into which a supporting member of a vehicle body side is to be inserted, the upper attachment portion being disposed in an upper part of the elastic body;
    a lower attachment portion having a lower attachment hole which extends parallel with the axial direction of the elastic body and into which a supporting member of an exhaust pipe side is to be inserted, the lower attachment being disposed in a lower part of the elastic body positioned symmetrically to the upper part where the upper attachment portion is disposed; and
    a pair of arm portions extending in a vertical direction and mutually connecting the upper attachment portion and the lower attachment portion to form the ring shape,
    wherein a first reinforcement rib formed of elastic material is integrally formed on an outer circumferential surface of each of the pair of arm portions so as to protrude at a predetermined height and extend continuously in the vertical direction along the arm portions, an upper end of the first reinforcement rib being located at a higher position than a connecting position of an inner circumferential surface of the arm portion and the upper attachment portion and at a higher position than the center of the upper attachment hole of the upper attachment portion, while a lower end of the first reinforcement rib is located at a lower position than a connecting position of the inner circumferential surface of the arm portion and the lower attachment portion and at a lower position than the center of the lower attachment hole of the lower attachment portion.

2. The exhaust pipe support according to claim 1, wherein the first reinforcement rib protrudes such that a height thereof gradually increases from its upper end and lower end to its central part in the vertical direction.

3. The exhaust pipe support according to claim 1, wherein a protruding end of the first reinforcement rib extends from one of the upper end and the lower end of the first reinforcement rib to the other while drawing a smooth curve with no local concavity and convexity.

4. The exhaust pipe support according to claim 1, wherein the first reinforcement rib has an inverted U-shaped or rounded inverted V-shaped cross section.

5. The exhaust pipe support according to claim 1, wherein only one first reinforcement rib is formed integrally on the each outer circumferential surface of the arm portions so as to be located in the central part of the arm portion in the axial direction of the elastic body.

6. The exhaust pipe support according to claim 1, wherein a maximum height of the first reinforcement rib is dimensioned to be 30 to 150% relative to a thickness of the arm portion in the direction perpendicular to the axial direction of the elastic body.

7. The exhaust pipe support according to claim 1, wherein on at least either one of lateral surfaces of the arm portion located on both sides in the axial direction of the elastic body having the ring shape, a second reinforcement rib formed of elastic material is integrally formed such that the second reinforcement rib protrudes at a predetermined height and extends continuously in the vertical direction along the arm portion.

8. The exhaust pipe support according to claim 7, wherein an upper end of the second reinforcement rib is positioned on at least one of end faces on both sides in an axial direction of the upper attachment portion, while a lower end of the second reinforcement rib is positioned on an end face of the lower attachment portion on the side where the upper end of the second reinforcement rib is positioned.

9. The exhaust pipe support according to claim 7, wherein the second reinforcement rib has an inverted U-shaped or rounded inverted V-shaped cross section.

10. The exhaust pipe support according to claim 7, wherein a maximum height of the second reinforcement rib is dimensioned to be 10 to 50% relative to a width of the arm portion in the direction parallel with the axial direction of the elastic body.

* * * * *